United States Patent
Kishida

(10) Patent No.: US 8,682,152 B2
(45) Date of Patent: Mar. 25, 2014

(54) CAMERA BODY, INTERCHANGEABLE LENS, AND INTERMEDIATE LENS

(75) Inventor: Naotaka Kishida, Osaka (JP)

(73) Assignee: Panasonic Corporation, Osaka (JP)

( * ) Notice: Subject to any disclaimer, the term of this patent is extended or adjusted under 35 U.S.C. 154(b) by 147 days.

(21) Appl. No.: 13/292,140

(22) Filed: Nov. 9, 2011

(65) Prior Publication Data

US 2012/0114319 A1 May 10, 2012

(30) Foreign Application Priority Data

Nov. 10, 2010 (JP) .................................. 2010-251477

(51) Int. Cl.
G03B 17/00 (2006.01)
(52) U.S. Cl.
USPC .......................................................... 396/71
(58) Field of Classification Search
USPC ........................................... 396/71, 529, 530
See application file for complete search history.

(56) References Cited

U.S. PATENT DOCUMENTS

| 4,572,638 A | 2/1986 | Nakai et al. |
| 4,728,980 A * | 3/1988 | Nakamura et al. ............... 396/71 |
| 2009/0268078 A1* | 10/2009 | Miyazaki et al. ............. 348/345 |
| 2010/0091175 A1* | 4/2010 | Shintani et al. ............... 348/345 |

FOREIGN PATENT DOCUMENTS

| JP | 59-188622 | 10/1984 |
| JP | 63-118138 | 5/1988 |
| JP | 2-139509 | 5/1990 |
| JP | 2-308211 | 12/1990 |

* cited by examiner

*Primary Examiner* — Clayton E Laballe
*Assistant Examiner* — Dennis Hancock
(74) *Attorney, Agent, or Firm* — Panasonic Patent Center

(57) ABSTRACT

A camera body is mountable with an intermediate lens which is mountable to an interchangeable lens. The intermediate lens has a first lens and a first drive controller operable to control drive of the first lens. The interchangeable lens has a second lens and a second drive controller operable to control drive of the second lens. The camera body includes an operation unit operable to receive an operation performed by a user, and a body controller operable to control the first drive controller and the second drive controller. The body controller sends a signal for driving the first lens to the first drive controller and/or sends a signal for driving the second lens to the second drive controller, according to the user operation performed on the operation unit.

11 Claims, 3 Drawing Sheets

CAMERA BODY, INTERCHANGEABLE LENS, AND INTERMEDIATE LENS

BACKGROUND

1. Technical Field

The technical field relates to an interchangeable lens and a camera body which compose a camera system, and an intermediate lens mounted between the interchangeable lens and the camera body.

2. Related Art

For a camera system including an interchangeable lens and a camera body, there is known an intermediate lens mounted between the interchangeable lens and the camera body. By mounting the intermediate lens, for example, a focal length can be extended compared to that of the interchangeable lens alone (see, for example, JP59-188622A).

In a conventional intermediate lens, a group of lenses included in the intermediate lens is fixed within a lens barrel. Therefore, when the intermediate lens is mounted to a camera system, the camera system is limited in flexibility of control of an optical system included in the camera system. For example, when an intermediate lens with a magnification fixed to 2× (double) mounted to an interchangeable lens with a zoom magnification of 4× (four times), the zoom magnification of this combination is in a range equivalent to 2× to 8× (eight times) compared to that of the interchangeable lens alone. Namely, with the intermediate lens being mounted to the camera system, the zoom magnification cannot be set to a magnification of 1× (one time) and thus the intermediate lens needs to be removed temporarily. Hence, even if a user wants to shot an image at a magnification of 1×, the user cannot shot an image right away and thus usability is poor.

SUMMARY

In view of the above-described problem, a camera body is provided that offers excellent usability even when an intermediate lens is mounted to the camera body.

In a first aspect, a camera body to which an intermediate lens is mountable is provided. The intermediate lens is mountable to an interchangeable lens. The intermediate lens has a first lens and a first drive controller operable to control drive of the first lens. The interchangeable lens has a second lens and a second drive controller operable to control drive of the second lens. The camera body includes an operation unit operable to receive an operation performed by a user, and a body controller operable to control the first drive controller and the second drive controller. The body controller sends a signal for driving the first lens to the first drive controller and/or sends a signal for driving the second lens to the second drive controller, according to the user operation performed on the operation unit.

In a second aspect, an interchangeable lens is provided that is mountable to an intermediate lens having a first lens and a first drive controller operable to control drive of the first lens. The interchangeable lens includes a second lens, a second drive controller operable to control drive of the second lens, an operation unit operable to receive an operation performed by a user, and an interchangeable lens controller operable to send a signal for driving the first lens to the first drive controller and/or send a signal for driving the second lens to the second drive controller, according to the operation received by the operation unit.

In a third aspect, an intermediate lens mountable between an interchangeable lens and a camera body is provided. The intermediate lens includes a zoom lens, a lens driver operable to drive the zoom lens, a first receiving unit operable to receive a control signal for driving the zoom lens from the camera body, a second receiving unit operable to receive a control signal for driving the zoom lens from the interchangeable lens, and a controller operable to control the lens driver based on the control signal received through the first or second receiving unit.

According to the above aspects, the drive of an optical system of an intermediate lens can be controlled from a camera body or an interchangeable lens. Hence, in a camera system with the intermediate lens mounted thereto, the optical system of the intermediate lens can be controlled from the camera body or the interchangeable lens, thus improving usability of the camera system with the intermediate lens mounted thereto.

DETAILED DESCRIPTION OF PREFERRED EMBODIMENT

Embodiments will be described below with reference to the accompanying drawings.

1. First Embodiment

The configuration and operation of a digital camera according to a first embodiment will be described below using the drawings.

1-1. Configuration

A configuration of the digital camera will be described below.

1-1-1. Configuration

Figure 1:
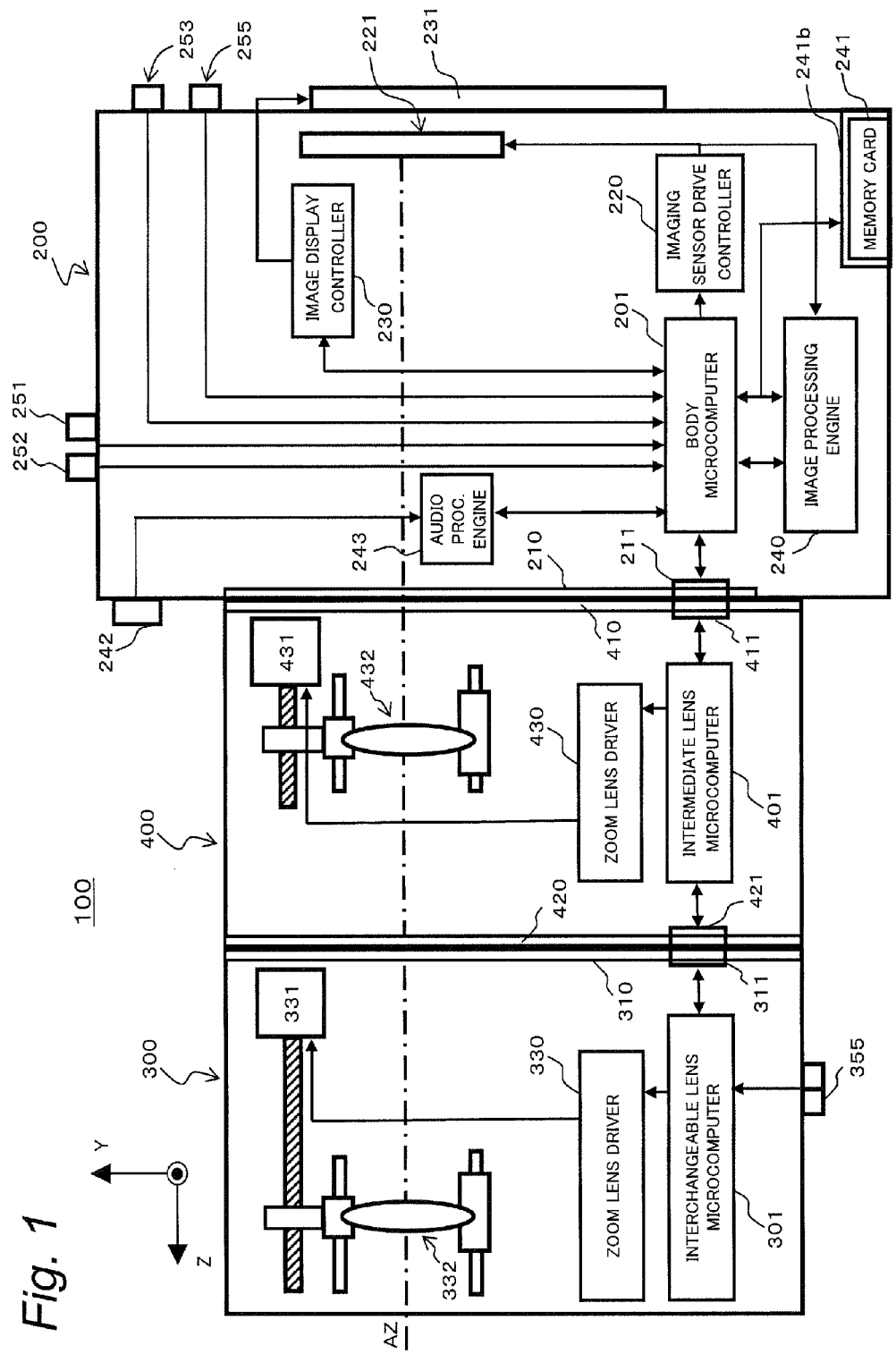
FIG. 1 is a schematic diagram of a configuration of a digital camera.

An overview of the digital camera will be described. FIG. 1 is a schematic diagram of a configuration of the digital camera. The digital camera 100 is a lens-interchangeable digital camera: An intermediate lens 400 (intermediate conversion lens) is mountable between a camera body 200 and an interchangeable lens 300. In general, an intermediate lens is a lens which is mounted between each of various interchangeable lenses and a camera body and is capable of changing a focal length of the interchangeable lens. By using an intermediate lens, a user does not need to have many expensive interchangeable lenses and can perform shooting at various focal lengths with a small number of interchangeable lenses. In particular, the intermediate lens 400 of the present embodiment has variable magnification, not fixed magnification. In general, when a user wishes to perform shooting at a magnification of 1× (one time) with a fixed focal length type intermediate lens being mounted to a camera body, the interchangeable lens needs to be removed from the camera body and shooting at an intermediate focal length cannot be performed. The intermediate lens 400 of the present embodiment can change the focal length by electromotive drive and thus can solve such problems.

Furthermore, as with the intermediate lens 400, the interchangeable lens 300 can also be electrically driven (electromotive drive) and does not need to be driven manually. Thus, in moving image shooting, noise caused by a zoom drive operation sound at manual driving can be prevented and usability of shooting can be improved. In addition, the electromotive drive enables remote control and zoom manipulation by a program.

1-1-2. Configuration of Camera System

The camera body 200 is mounted to an intermediate lens mount (on the body side) 410 provided on the intermediate lens 400, through a body mount 210. Communication between a body microcomputer 201 and an intermediate lens microcomputer 401 is enabled by a body communication unit 211 and an intermediate lens communication unit (on the body side) 411.

Furthermore, the interchangeable lens 300 is mounted to an intermediate lens mount (on the lens side) 420 provided on the intermediate lens 400, through a lens mount 310. Communication between an interchangeable lens microcomputer 301 and the intermediate lens microcomputer 401 is enabled by a lens communication unit 311 and an intermediate lens communication unit (on the lens side) 421.

That is, the interchangeable lens microcomputer 301, the intermediate lens microcomputer 401, and the body microcomputer 201 can perform communication with one another through the lens communication unit 311, the intermediate lens communication unit (on the lens side) 421, the intermediate lens communication unit (on the body side) 411, and the body communication unit 211.

1-1-3. Configuration of Camera Body

A general configuration of the camera body 200 will be described. The camera body 200 includes the body mount 210 and the body communication unit 211 that performs communication with the interchangeable lens 300 and the intermediate lens 400. In addition, the camera body 200 includes the body microcomputer 201, an image processing engine 240, an imaging sensor drive controller 220, an imaging sensor 221, an image display controller 230, an image display unit 231, a card slot 241b which a memory card 241 can be inserted thereinto and removed therefrom, a built-in microphone 242, a still image shooting operation button 251, a moving image shooting operation button 252, a menu operation button 253, and a zoom manipulation button 255.

The body communication unit 211, the lens communication unit 311, and the interchangeable lens communication unit (on the body side) 411 can perform data transmission and reception with each other. Communication data include, for example, focal length data, a zoom drive control signal, a focus drive control signal, an exposure synchronizing signal, information indicating whether moving image recording is being performed, and information indicating whether a silence priority mode is set. The body microcomputer 201 can generate various control signals by obtaining those communication data through the communication units. For example, when the zoom manipulation button 255 is operated, the body microcomputer 201 can provide a lens control command for a zoom operation.

The imaging sensor 221 is a sensor that converts an optical image formed through the optical systems of the interchangeable lens 300 and the intermediate lens 400 to an electrical signal to generate image data. Drive of the imaging sensor 221 is controlled by a timing signal generated by the imaging sensor drive controller 220. The image data generated by the imaging sensor 221 is supplied to the image processing engine 240 to be subjected to various image processing by the image processing engine 240.

The image processing engine 240 can perform various image processing on the image data supplied from the imaging sensor 221, such as a YC conversion process, a white balance correction process, a gamma correction process, an image enlargement/reduction, an image compression/decompression process, and a focus determination process by detecting a contrast value. The image data processed by the image processing engine 240 is recorded in the memory card 241 or is displayed on the image display unit 231 through the image display controller 230.

The image display unit 231 displays and plays back a live monitor image, recorded images, and so on, based on instructions from the image display controller 230.

The built-in microphone 242 converts sound inputted at moving image shooting to an electrical signal. Though not shown in FIG. 1, the digital camera 100 has a terminal to connect an external microphone. The external microphone has excellent directivity and is configured to cause noise caused by the driver of the interchangeable lens 300 or the intermediate lens 400 and noise caused by the camera body 200 to be less likely to be recorded. Hence, the digital camera 100 may be configured such that, when an external microphone is connected to the digital camera 100, the built-in microphone 242 is not used but the external microphone is used. An audio processing engine 243 converts an analog audio signal from the built-in microphone 242 or the external microphone to a digital signal. At that time, various audio processing can be performed such as gain control, noise cancellation by various filters, and recognition of surrounding environmental sound.

At moving image shooting, the body microcomputer 201 performs a multiplexing process in a predetermined format on moving image data which is captured by the imaging sensor 221 and digital-converted by the image processing engine 240 and audio data which is inputted by the built-in microphone 242 and digital-converted by the audio processing engine 243, and records the resulting data in the memory card 241 as a moving image file.

The memory card 241 stores still image data and moving image data generated by the imaging sensor 221. The body microcomputer 201 can perform a process of recording various data in the memory card 241 through the card slot 241b.

At the top of the camera body 200 are provided the still image shooting operation button (shutter button) 251 and the moving image shooting operation button 252. Operation of the button causes each of various shooting modes to be performed. The still image shooting operation button 251 has a half-press state where the button is pressed lightly, and a full-press state where the button is pressed deeply. When receiving a half-press operation performed on the still image shooting operation button 251 by the user, the body microcomputer 201 performs control (autofocus control) of a focus lens (not shown) to focus on a subject. Then, when receiving a full-press operation, still image data generated at the timing of the pressing is recorded in the memory card 241. When receiving a full-press operation performed on the moving image shooting operation button 252 by the user, the body microcomputer 201 starts generation of audio data by the built-in microphone 242 and generation of recording moving image data by the imaging sensor 221, and records the generated moving image file in the memory card 241. Namely, when receiving an operation performed on the moving image shooting operation button 252 by the user, the body microcomputer 201 performs each of various operations for moving image recording.

The menu operation button 253 is a button operated by the user to perform various camera settings.

The body microcomputer 201 is a control apparatus that takes control of the main part of the camera body 200, and detects operations performed on the still image shooting operation button (shutter button) 251, the moving image shooting operation button 252, and the menu operation button 253. In addition, the body microcomputer 201 has a function of detecting that the interchangeable lens 300 or the intermediate lens 400 is mounted to the camera body 200 or a function of obtaining, from the interchangeable lens 300, information required to control the digital camera 100 such as focal length information. Furthermore, the body microcomputer 201 sends a control command for controlling an interchangeable zoom lens 332 through the interchangeable lens microcomputer 301. In addition, the body microcomputer 201 sends a control command for controlling an intermediate zoom lens 432 through the intermediate lens microcomputer 401.

1-1-4. Configuration of Interchangeable Lens

A general configuration of the interchangeable lens 300 will be described. The interchangeable lens mount 310 can be mounted to the camera body mount 210 or the intermediate lens mount 420. The interchangeable lens microcomputer 301 can communicate with the body microcomputer 201 and the intermediate lens microcomputer 401 through the interchangeable lens communication unit 311, the body communication unit 211, the intermediate lens communication unit (on the camera body side) 411, and the intermediate lens communication unit (on the interchangeable lens side) 421. In addition, the interchangeable lens 300 has a zoom lens drive controller 330, a zoom motor 331, the zoom lens 332, and a zoom manipulation button 355. When the interchangeable lens microcomputer 301 detects zoom manipulation performed on the zoom manipulation button 355, the interchangeable lens microcomputer 301 drives the zoom motor 331 through the zoom lens drive controller 330, so that the zoom lens 332 can be moved in an optical axis direction to change the shooting focal length. As such, the interchangeable lens 300 of the present embodiment is an electromotive zoom lens.

1-1-5. Configuration of Intermediate Lens

A general configuration of the intermediate lens 400 will be described. The intermediate lens mount (on the camera body side) 410 is connected to the camera body mount 210, and the intermediate lens mount (on the interchangeable lens side) 420 is connected to the interchangeable lens mount 310. The intermediate lens microcomputer 401 can communicate with the body microcomputer 201 through the intermediate lens communication unit (on the camera body side) 411 and the body communication unit 211. The intermediate lens microcomputer 401 can communicate with the interchangeable lens microcomputer 301 through the intermediate lens communication unit (on the interchangeable lens side) 421 and the lens communication unit 311. When zoom manipulation is performed on the zoom manipulation button 255 of the camera body 200, intermediate lens zoom drive information is sent to the intermediate lens microcomputer 401 from the body microcomputer 201, and a zoom motor 431 is driven through a zoom lens drive controller 430 of the intermediate lens 400, so that the zoom lens 432 of the intermediate lens 400 can be moved in the optical axis direction to change the shooting focal length. When zoom manipulation is performed on the zoom manipulation button 355 of the interchangeable lens 300, intermediate lens zoom drive information is sent to the intermediate lens microcomputer 401 from the interchangeable lens microcomputer 301, and the zoom motor 431 of the intermediate lens 400 is driven through the zoom lens drive controller 430 of the intermediate lens 400, so that the zoom lens 432 of the intermediate lens 400 can be moved in the optical axis direction to change the shooting focal length. As such, the intermediate lens 400 of the present embodiment is an electromotive zoom lens (electromotive conversion lens).

1-2. Operation 1-2-1. Zoom Operation of Digital Camera

The digital camera 100 of the present embodiment has an electronic zoom function for electronically enlarging an image, in addition to an optical zoom by the interchangeable lens 300 and an optical zoom by the intermediate lens 400.

The electronic zoom is an electronic zoom function performed by the image processing engine 240 of the camera body 200. The electronic zoom cuts out a partial region (a region with a shooting resolution) from the whole imaging region of the imaging sensor 221 and outputs an image in the cut out region as a shooting image. Namely, by cutting out an image in a partial region of the imaging region, the size of a subject with respect to the entire image is relatively enlarged and thus a zoom effect can be achieved. When the resolution of an image to be shot is smaller than the maximum resolution of the imaging sensor 221, such an electronic zoom can provide an enlarged image without image degradation. For example, when the maximum resolution of the imaging sensor 221 is 4000 pixels×3000 pixels and the shooting resolution at moving image shooting is 1920 pixels×1080 pixels, an image in a region of 1920 pixels×1080 pixels in a region of 4000 pixels×3000 pixels of the imaging sensor 221 is extracted as a moving image. In this case, since the shooting resolution at moving image shooting is sufficiently smaller than the maximum resolution of the imaging sensor 221, image quality degradation does not occur even if an electronic zoom is performed. In the case of still image shooting, whether or not there is image quality degradation due to an electronic zoom depends on the shooting resolution set by the user. That is, when shooting is performed at the maximum resolution, if an electronic zoom is performed, then an image with image quality degradation results. The user can set any one of "high image quality electronic zoom", "high magnification electronic zoom", and "no electronic zoom" using the menu operation button 253 of the camera body 200. Specifically, in a case where the high image quality electronic zoom is set, an electronic zoom is performed in a rage where image quality degradation does not occur. In a case where the high magnification electronic zoom is set, when the electronic zoom is performed in a range where no image quality degradation occurs and thereafter an electronic zoom is further selected, the highest possible electronic zoom is performed in a range where significant image quality degradation due to pixel interpolation does not occur.

1-2-1-1. Drive Modes

The digital camera 100 of the present embodiment has, as a drive mode, three types of modes: normal mode, high speed mode, and silent mode. A method of driving the zoom lens and the zoom function varies for each drive mode. The drive mode is set by a user operation on the menu operation button 253 of the camera body 200.

The high speed mode is a mode to be used when the user wishes to quickly change the focal length. The high speed mode is performed when the zoom manipulation button 255 is long-pressed by the user or when an operation for high speed setting is performed on the zoom manipulation button 255 which is capable of setting a plurality of zoom speed levels. The silent mode is a mode to be used when zoom manipulation is performed at moving image shooting. The silent mode is to cause the drive sound of the zoom lens 332 of the interchangeable lens 300 and the drive sound of the zoom lens 432 of the intermediate lens 400 less likely to be recorded in a moving image. The normal mode refers to a mode other than the high speed mode and the silent mode.

Figure 2:
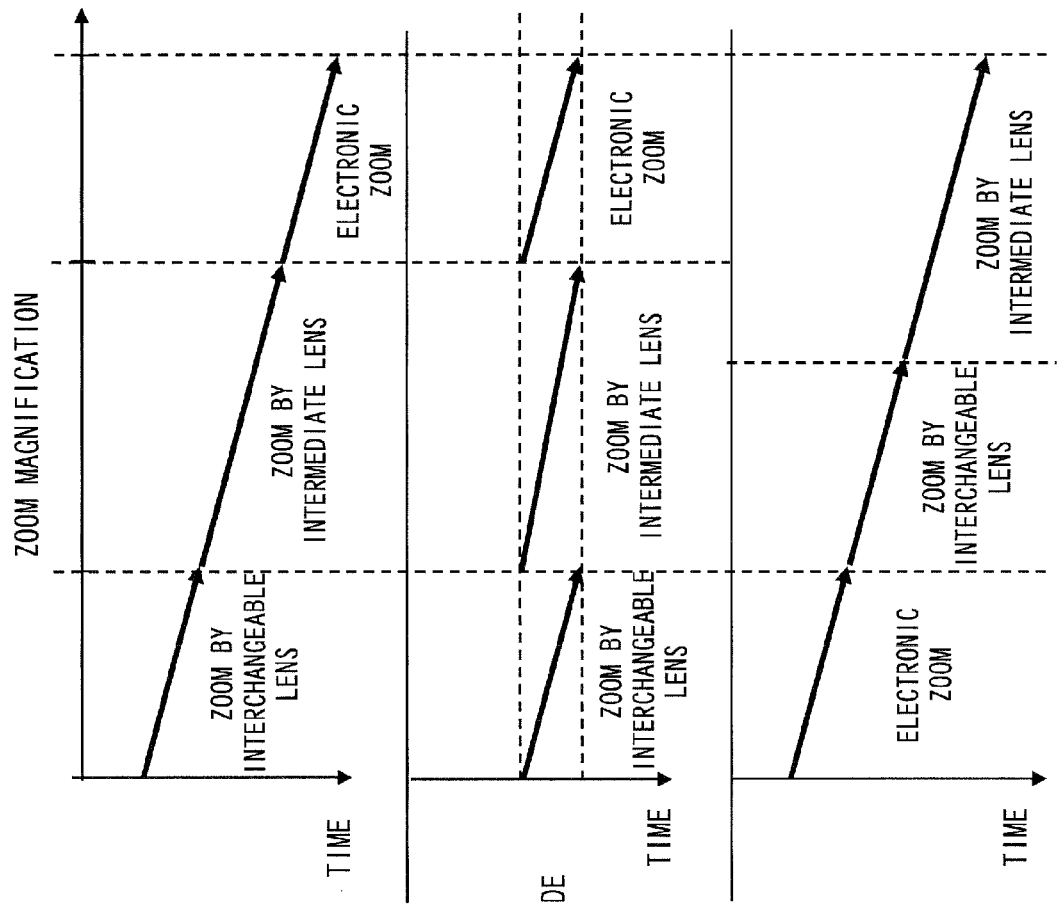
FIGS. 2A to 2C are diagrams describing driving of a zoom by an interchangeable lens, a zoom by an intermediate lens, and an electronic zoom in each of drive modes.

FIGS. 2A to 2C are diagrams describing the respective drive modes. FIGS. 2A to 2C are diagrams describing the drive timings of a zoom by the interchangeable lens 300, a zoom by the intermediate lens 400, and an electronic zoom in normal mode (FIG. 2A), high speed mode (FIG. 2B), and silent mode (FIG. 2C). In each diagram, the vertical axis represents passage of time and the horizontal axis represents zoom magnification with the passage of time. FIGS. 2A and 2C show a state in which zoom manipulation is performed from 1× zoom magnification to maximum zoom magnification. In FIGS. 2A and 2C, the horizontal axis represents a total zoom magnification of three types of zoom. On the contrary in FIG. 2B the horizontal axis represents the zoom magnification of an electronic zoom, a zoom by the interchangeable lens 300, and a zoom by the intermediate lens 400, respectively. As shown in FIGS. 2A to 2C, the order of zoom means to be driven varies due to the drive modes. In addition, as shown in FIGS. 2A and 2C, in the normal mode and the silent mode, zoom means to be driven is changed over according to the range of zoom magnification. A detail of each drive mode will be described below.

In the normal mode, as shown in FIG. 2A, with an increase in zoom magnification, first, a zoom operation by the interchangeable lens 300 is performed, then a zoom operation by the intermediate lens 400 is performed, and finally, an electronic zoom is performed. Specifically, in the normal mode, when zoom manipulation is performed starting from a magnification of 1× (one time), a zoom operation by the interchangeable lens 300 is performed until the zoom magnification of the interchangeable lens 300 reaches its maximum magnification. When the zoom magnification of the interchangeable lens 300 reaches its maximum magnification and then a higher zoom magnification is demanded, the zoom operation is changed over to a zoom operation by the intermediate lens 400. When the zoom magnification of the intermediate lens 400 reaches its maximum magnification and a higher zoom magnification is demanded, a zoom operation by an electronic zoom is performed.

In the high speed mode, as shown in FIG. 2B, a zoom by the interchangeable lens 300, a zoom by the intermediate lens 400, and an electronic zoom are controlled to be driven in parallel. Accordingly, at the high speed mode, the time required for reaching the maximum zoom magnification of the camera system 100, which is obtained by a combination of zoom by the interchangeable lens 300, zoom by the intermediate lens 400, and the electronic zoom by the camera body 200, can be shorter than that at the normal mode.

In the silent mode, as shown in FIG. 2C, with an increase in zoom magnification, first, an electronic zoom is performed, then a zoom operation by the interchangeable lens 300 is performed, and finally, a zoom operation by the intermediate lens 400 is performed. Specifically, in the silent mode, when zoom manipulation is performed starting from a state with a magnification of 1×, a zoom operation by an electronic zoom is performed until the zoom magnification of the electronic zoom reaches its maximum magnification. When the magnification of the electronic zoom reaches its maximum magnification and then a higher zoom magnification is demanded, the zoom operation is changed over to a zoom operation by the interchangeable lens 300. When the zoom magnification of the interchangeable lens 300 reaches its maximum magnification (e.g., 6×) and then a higher zoom magnification is demanded, a zoom operation by the intermediate lens 400 is performed. The silent mode is a mode used to perform a zoom operation with minimal lens drive sound. An electronic zoom does not generate drive sound in the silent mode, and thus the electronic zoom is performed first.

Figure 3:
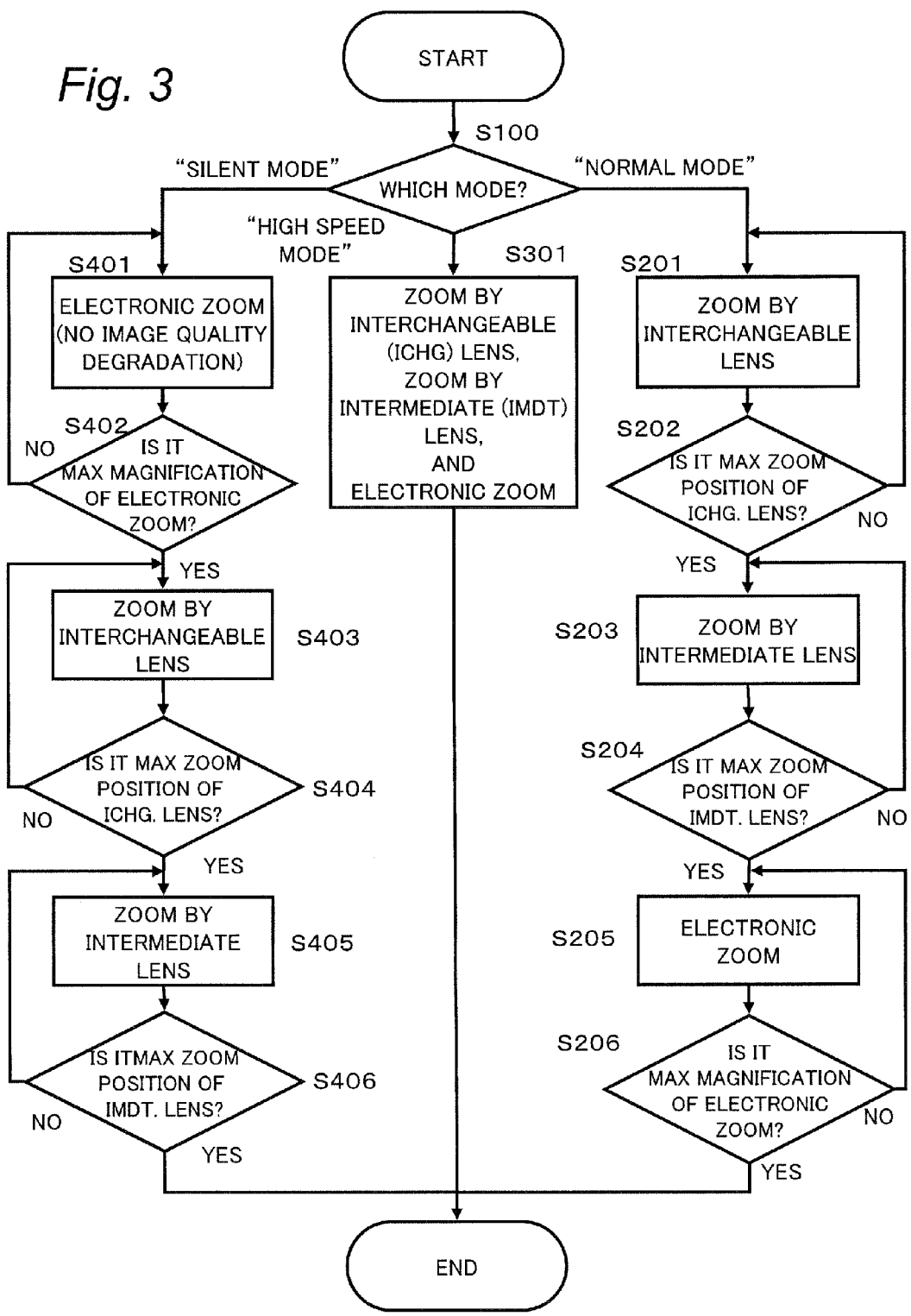
FIG. 3 is a flowchart showing a zoom operation of the digital camera.

1-2-2. Operation Performed at Zoom Manipulation on Zoom Manipulation Button of Camera Body The operation performed when the user performs zoom manipulation on the zoom manipulation button 255 of the camera body 200 in the present embodiment will be described with reference to a flowchart of FIG. 3. Mote that the flowchart of FIG. 3 shows the operation performed when the user continuously operates the zoom manipulation button 255 of the camera body 200 so as to change the zoom magnification from a 1× magnification (minimum zoom magnification) to the maximum zoom magnification.

The body microcomputer 201 first determines a drive mode set on the digital camera 100 (S100). The drive modes include, as described above, three types: normal mode, high speed mode, and silent mode. A zoom operation in a drive mode according to the determination result is performed.

If the mode set on the digital camera 100 is the normal mode, then when zoom manipulation is performed on the zoom manipulation button 255 of the camera body 200, the body microcomputer 201 sends a drive command to the interchangeable lens microcomputer 301. In the interchangeable lens 300, the interchangeable lens microcomputer 301 receives the drive command and controls the zoom lens drive controller 330 of the interchangeable lens 300 to drive the zoom lens 332 (S201). The zoom lens drive controller 330 determines whether the current zoom position is the maximum zoom position of the zoom lens 332 of the interchangeable lens 300 (S202). If the zoom lens 332 has not reached the maximum zoom position, then the zoom lens 332 is further driven (S201). If the zoom lens 332 of the interchangeable lens 300 has reached the maximum zoom position, then the interchangeable lens microcomputer 301 notifies the body microcomputer 201 that the zoom lens 332 has reached the maximum zoom position.

If the zoom lens 332 of the interchangeable lens 300 has reached the maximum zoom position, then the body microcomputer 201 sends a drive command to the intermediate lens microcomputer 401. The intermediate lens microcomputer 401 receives the drive command and controls the zoom lens drive controller 430 of the intermediate lens 400 to drive the zoom lens 432 (S203). The zoom lens drive controller 430 determines whether the position of the zoom lens 432 is the maximum zoom position of the zoom lens 432 (S204). If the zoom lens 432 has not reached the maximum zoom position, then the zoom lens drive controller 430 further drives the zoom lens 432 (S203). If the zoom lens 432 of the intermediate lens 400 has reached the maximum zoom position, then the intermediate lens microcomputer 401 notifies the body microcomputer 201 that the zoom lens 432 of the intermediate lens 400 has reached the maximum zoom position.

If the zoom lens 432 of the intermediate lens 400 has reached the maximum zoom position, then an electronic zoom is performed next. Namely, the image processing engine 240 performs an electronic zoom according to the setting (S205). Note that a determination as to whether to perform an electronic zoom is made according to the setting made by a user operation on the menu, as described above. Specifically, if the setting made by the user is "no electronic zoom", then an electronic zoom is not performed. On the other hand, if the setting made by the user is either "high image quality electronic zoom" or "high magnification electronic zoom", then an electronic zoom is performed according to the setting. The image processing engine 240 determines whether the current electronic zoom magnification is the set maximum magnification (S206). The image processing engine 240 performs the electronic zoom until the maximum magnification is reached (S205 and S206).

As described above, in the normal mode, zoom operations are performed according to zoom manipulation, in the order of the zoom operation by the interchangeable lens 300, the zoom operation by the intermediate lens 400, and the electronic zoom operation.

If it is determined in step S100 that the mode set on the digital camera 100 is the high speed mode, then when high speed zoom manipulation is performed using the zoom manipulation button 255 of the camera body 200, the body microcomputer 201 simultaneously sends a drive command to the interchangeable lens microcomputer 301 and the intermediate lens microcomputer 401. When the interchangeable lens microcomputer 301 and the intermediate lens microcomputer 401 receive the drive instructions, the zoom lens drive controller 330 of the interchangeable lens 300 immediately drives the zoom lens 332 of the interchangeable lens 300 and the zoom lens drive controller 430 of the intermediate lens 400 immediately drives the zoom lens 432 of the intermediate lens 400. Furthermore, the image processing engine 240 performs an electronic zoom (S301). As such, in the high speed mode, three zoom operations, i.e., the zoom operation by the interchangeable lens 300, the zoom operation by the intermediate lens 400, and the electronic zoom operation are performed at the same time. Note that the electronic zoom is performed according to the setting made by a user operation on the menu, as in the case of the normal mode.

If it is determined in step S100 that the mode set on the digital camera 100 is the silent mode, then when zoom manipulation is performed on the zoom manipulation button 255 of the camera body 200 during moving image shooting, first, the image processing engine 240 performs an electronic zoom (S401). The image processing engine 240 calculates the maximum magnification of an electronic zoom, according to a set mode such as "high image quality electronic zoom", "high magnification electronic zoom", and so on, and determines whether the current magnification of the electronic zoom is the maximum magnification (S402). If it is not the maximum magnification, then the image processing engine 240 further performs the electronic zoom (S401). If the maximum magnification is reached, then a zoom operation by the interchangeable lens 300 is performed (S403). Specifically, the body microcomputer 201 sends a drive command to the interchangeable lens microcomputer 301. When the interchangeable lens microcomputer 301 receives the drive command, the interchangeable lens microcomputer 301 controls the zoom lens drive controller 330 to drive the zoom lens 332 (S403). The zoom lens drive controller 330 determines whether the zoom lens 332 of the interchangeable lens 300 has reached the maximum zoom position (S404). If the zoom lens 332 of the interchangeable lens 300 has not reached the maximum zoom position, then the zoom lens drive controller 330 further drives the zoom lens 332 (S403). If the zoom lens 332 of the interchangeable lens 300 has reached the maximum zoom position, then the interchangeable lens microcomputer 301 stops the zoom operation and notifies the body microcomputer 201 that the zoom lens 332 of the interchangeable lens 300 has reached the maximum zoom position.

If the zoom lens 332 of the interchangeable lens 300 has reached the maximum zoom position, then a zoom operation by the intermediate lens 400 is performed. Accordingly, the body microcomputer 201 sends a drive command to the intermediate lens microcomputer 401. The intermediate lens microcomputer 401 receives the drive command and controls the zoom lens drive controller 430 of the intermediate lens 400 to drive the zoom lens 432 of the intermediate lens 400 (S405). The zoom lens drive controller 430 determines whether the zoom lens 432 has reached the maximum zoom position of the intermediate lens 400 (S406). If the zoom lens 432 of the intermediate lens 400 has not reached the maximum zoom position, then the zoom lens drive controller 430 further drives the zoom lens 432 (S405). If the zoom lens 432 has reached the maximum zoom position, then the intermediate lens microcomputer 401 stops the zoom operation and notifies the body microcomputer 201 that the zoom lens 432 has reached the maximum zoom position.

In the above-described example, the electronic zoom is performed, followed by the zoom by the interchangeable lens 300. This is because since the interchangeable lens 300 is farther away from the camera body 200 than the intermediate lens 400, it is considered that the drive sound of the zoom lens 332 of the interchangeable lens 300 is less likely to be picked up by the built-in microphone 242 than the drive sound of the zoom lens 432 of the intermediate lens 400. Further, when the intermediate lens 400 with the interchangeable lens 300 is mounted to the camera body 200, the camera body 200 may determine whether to preferentially drive the interchangeable lens 300 or the intermediate lens 400, based on drive sound data stored in the respective microcomputers.

1-2-3. Operation Performed at Zoom Manipulation on Zoom Manipulation Button of Interchangeable Lens In the above description, the operation performed on the zoom manipulation button 255 of the camera body 200 is described. An example of the operation performed when the user operates the zoom manipulation button 355 of the interchangeable lens 300 will be described below.

In the case of zoom manipulation performed on the zoom manipulation button 355 of the interchangeable lens 300, the processes of the body microcomputer 201 and the interchangeable lens microcomputer 301 are replaced by each other in the above-described case of zoom manipulation performed through the zoom manipulation button 255 of the camera body 200. That is, for the operation performed at zoom manipulation on the zoom manipulation button 255 of the camera body 200, the host (control entity) is the body microcomputer 201. In contrast to this, for the operation performed at zoom manipulation on the zoom manipulation button 355 of the interchangeable lens 300, the host (control entity) is the interchangeable lens microcomputer 301. Namely, the interchangeable lens microcomputer 301 controls the drive of both the zoom lens 332 of the interchangeable lens 300 and the zoom lens 432 of the intermediate lens 400, based on an operation performed on the zoom manipulation button 355 of the interchangeable lens 300.

Specifically, in the process described with reference to the flowchart of FIG. 3, the control of the body microcomputer 201 based on an operation performed on the zoom manipulation button 255 of the camera body 200 is performed by the interchangeable lens microcomputer 301 based on an operation performed on the zoom manipulation button 355 of the interchangeable lens 300. Specifically, the interchangeable lens microcomputer 301 sends a drive command to the intermediate lens microcomputer 401 and the body microcomputer 201. The intermediate lens microcomputer 401 receives the drive instruction from the interchangeable lens microcomputer 301 and drives the zoom lens 432. The body microcomputer 201 receives the drive instruction from the interchangeable lens microcomputer 301 and drives an electronic zoom. Note that the interchangeable lens microcomputer 301 obtains from the body microcomputer 201 information that only the body microcomputer 201 knows, such as the result of a mode determination and information about an electronic zoom.

By such control, even in a camera body 200 with no zoom manipulation button 255, zoom manipulation of the intermediate lens 400 can be performed only with the zoom manipulation button 355 of the interchangeable lens 300, and a zoom manipulation button of the intermediate lens 400 is not required, either. In addition, even when the intermediate lens 400 has a zoom manipulation button, the user only needs to operate the zoom manipulation button 355 of the interchangeable lens 300 and thus the need for the user to operate both the interchangeable lens 300 and the intermediate lens 400 is eliminated, improving ease of operation.

As described above, the zoom lens 432 of the intermediate lens 400 may be controlled by the interchangeable lens 300 (the interchangeable lens microcomputer 301). By thus controlling the intermediate lens 400 from the interchangeable lens 300, the user can perform zoom manipulation by operating integrally the interchangeable lens 300 and the intermediate lens 400, without awareness of the intermediate lens 400 when operating the zoom manipulation button 355 of the interchangeable lens 300.

Note that regarding a method of implementing a zoom operation based on operation information of the zoom manipulation button 355 of the interchangeable lens 300, the following method is also considered. Specifically, operation information of the zoom manipulation button 355 of the interchangeable lens 300 may be sent to the body microcomputer 201 and the body microcomputer 200 may perform the above-described zoom control based on the received operation information of the zoom manipulation button 355 of the interchangeable lens 300.

1-3. Summary

As described above, the camera body 200 of the present embodiment can be mounted with the intermediate lens 400 mountable to the interchangeable lens 300 to be mounted thereto. The intermediate lens 400 has the zoom lens 432 and the intermediate lens microcomputer 401 that controls drive of the zoom lens 432. The interchangeable lens 300 has the zoom lens 332 and the interchangeable lens microcomputer 301 that controls drive of the zoom lens 332. The camera body 200 includes the zoom manipulation button 255 that receives a user operation for zoom, and the body microcomputer 201 that controls the interchangeable lens microcomputer 301 of the interchangeable lens 300 and the intermediate lens microcomputer 401 of the intermediate lens 400. The body microcomputer 201 sends a signal for driving the zoom lens 332 of the interchangeable lens 300 to the interchangeable lens microcomputer 301 and/or sends a signal for driving the zoom lens 432 of the intermediate lens 400 to the intermediate lens microcomputer 401, according to the user operation on the zoom manipulation button 255.

The interchangeable lens 300 of the present embodiment is mountable to the intermediate lens 400 including the zoom lens 432 and the intermediate lens microcomputer 401 that controls drive of the zoom lens 432. The interchangeable lens 300 includes the zoom lens 332, the zoom lens drive controller 330 that controls drive of the zoom lens 332, the zoom manipulation button 355 that receives a user operation; and the interchangeable lens microcomputer 301 that sends a signal for driving the zoom lens 432 to intermediate lens microcomputer 401 and/or sends a signal for driving the zoom lens 332 to the zoom lens drive controller 330, according to the operation received by the zoom manipulation button 355.

The intermediate lens 400 of the present embodiment is used, inserted between the interchangeable lens 300 and the camera body 200. The intermediate lens 400 includes the zoom lens 432, the zoom lens drive controller 430 that drives the zoom lens 432, the intermediate lens communication unit (on the body side) 411 that receives a control signal for driving the zoom lens 432 from the camera body 200, the intermediate lens communication unit (on the lens side) 421 that receives a control signal for driving the zoom lens 432 from the interchangeable lens 300, and the intermediate lens microcomputer 401 that controls the zoom lens drive controller 430 based on the control signal received through the intermediate lens communication unit 411 or 421.

According to the above-described configuration, the drive of optical system 432 of the intermediate lens 400 can be controlled from the camera body 200 or the interchangeable lens 300. Hence, in a camera system 100 with the intermediate lens 400 mounted thereto, the optical system 432 of the intermediate lens 400 can be controlled from the manipulation button 255 or 355 of the camera body 200 or the interchangeable lens 300, thus improving usability of the camera system 100 having the intermediate lens 400 mounted thereto.

2. Other Embodiments

An embodiment is not limited to the one described above and various modifications and changes may be made thereto without departing from the spirit and scope of the present invention. The above-described embodiment is essentially a preferred example and thus is not intended to limit the scope of the present invention, products to which the invention is applied, or applications of the invention.

The zoom range of the intermediate lens 400 may be limited according to a combination of the interchangeable lens 300 and the intermediate lens 400. For example, although a zoom range from 1× to 2× is available in the intermediate lens 400, the image quality may be adversely affected by the optical performance of the interchangeable lens depending on type of the interchangeable lens 300 mounted to the intermediate lens 400, if the intermediate lens 400 is used in the whole zoom range. In such a case, the zoom range of the intermediate lens 400 can be limited to 1.0-1.8×. That is, in the operation performed at zoom manipulation on the zoom manipulation button 255 of the camera body 200, the zoom range may be limited in a drive control command from the body microcomputer 201 to the intermediate lens microcomputer 401. Likewise, during the operation performed at zoom manipulation on the zoom manipulation button 355 of the interchangeable lens 300, the zoom range may be limited in a drive control command from the interchangeable lens microcomputer 301 to the intermediate lens microcomputer 401.

Furthermore, drive power to the electromotive zoom of the interchangeable lens 300 and the electromotive zoom of the intermediate lens 400 is supplied from the camera body 200. When the interchangeable lens 300 with large zoom drive current and the intermediate lens 400 with large zoom drive current are mounted to the camera system 100 at the same time, zoom drive of the interchangeable lens 300 and the intermediate lens 400 may not be performed simultaneously. In this case, the camera system 100 can be configured such that parallel drive is not performed in the high speed mode too. For example, when the interchangeable lens 300 and the intermediate lens 400 are mounted to the camera body 200, the camera body 200 determines the types of the interchangeable lens 300 and the intermediate lens 400 from information sent from the interchangeable lens 300 and the intermediate lens 400. Then, when it is determined based on the types of the interchangeable lens 300 and the intermediate lens 400 that simultaneous zoom drive thereof cannot be performed, even if zoom manipulation in the high speed mode is commanded, zoom drive in the normal mode may be performed.

In the selection of high speed mode/silent mode, the body microcomputer 201 may be automatically set according to the shooting conditions. For example, during moving image shooting in the high speed mode, the silent mode may be automatically set. Alternatively, when the environmental sound is quiet, the drive sound of the interchangeable lens 300 or the intermediate lens 400 is highly likely to become noticeable. Thus, the silent mode may be set based on the result of recognition of surrounding environmental sound by the audio processing engine 243, when the environmental sound is less than or equal to a predetermined level. Furthermore, for the interchangeable lens 300 and intermediate lens 400 of which drive sound levels are high, the silent mode may be set. Regarding selection of the silent mode, when an external microphone is mounted or when the audio processing engine 243 has a noise cancellation effect on the drive sounds of the interchangeable lens 300 and the intermediate lens 400, it is considered that there is little influence of the drive sounds and thus high speed mode may be set.

In the normal mode, the processing order in the flowchart shown in FIG. 3 (steps S201 to S205) is an example and is not intended to define the order, and thus, zoom drive of the intermediate lens 400 may be performed prior to zoom drive of the interchangeable lens 300.

The above embodiment describes exemplarily that the zoom lens 432 of the intermediate lens 400 is controlled from the camera body 200 or the interchangeable lens 300. However an optical member to be controlled from the camera body 200 or the interchangeable lens 300 is not limited to a zoom lens. When the intermediate lens 400 includes an optical member (for example, focus lens or diaphragm) other than the zoom lens, such optical member may be controlled from the camera body 200 or the interchangeable lens 300.

Industrial Applicability

A lens control apparatus of the above embodiments can be applied to electronic devices having a lens control apparatus mounted thereon, which include not only digital cameras but also camcorders and mobile phones with a camera.

What is claimed is:

1. A camera body to which an intermediate lens is mountable, the intermediate lens being mountable to an interchangeable lens, wherein
the intermediate lens has a first lens and a first drive controller operable to control drive of the first lens, the first lens being provided for achieving a specific optical function,
the interchangeable lens has a second lens and a second drive controller operable to control drive of the second lens, the second lens being provided for achieving the same specific optical function as the first lens, wherein
both the first lens and second lens are zoom lenses,
the camera body comprises:
an operation unit operable to receive an operation performed by a user; and
a body controller operable to control the first drive controller and the second drive controller, and
the body controller sends a signal for driving the first lens to the first drive controller and/or sends a signal for driving the second lens to the second drive controller, according to the user operation performed on the operation unit for achieving the specific optical function.

2. The camera body according to claim 1, wherein when the user operation performed on the operation unit is an instruction to set a zoom magnification in a first range in a whole range of zoom magnifications that can be achieved by the first lens and the second lens, the body controller sends a signal for driving the first lens to the first drive controller, and when the user operation performed on the operation unit is an instruction to set a zoom magnification in a second range in the whole range of zoom magnifications, the body controller sends a signal for driving the second lens to the second drive controller, the second range being different from the first range.

3. The camera body according to claim 1, further comprising:
an imaging unit operable to capture a subject image formed through the interchangeable lens and the intermediate lens, and thereby outputs image data; and
an electronic zoom controller operable to control an electronic zoom function for electronically enlarging the subject image represented by the image data, by changing an area of the imaging unit from which an image is output, wherein
the body controller has a plurality of drive modes for controlling drive of the first lens, drive of the second lens, and the electronic zoom function in order to change a zoom magnification, and
the body controller changes, according to the drive mode, a zoom magnification range in which the first lens is driven, a zoom magnification range in which the second lens is driven, and a zoom magnification range in which the electronic zoom function is operated.

4. The camera body according to claim 3, wherein the plurality of drive modes include a drive mode which performs a zoom operation by the first lens, a zoom operation by the second lens, and the electronic zoom function in parallel.

5. The camera body according to claim 3, wherein the plurality of drive modes include a drive mode which performs the electronic zoom function in a first zoom magnification range including a minimum zoom magnification, and drives the first lens or the second lens in a second zoom magnification range higher than the first zoom magnification range.

6. The camera body according to claim 1, wherein the user operation performed on the operation unit for achieving the specific optical function is an instruction to drive the first lens and/or the second lens.

7. An interchangeable lens mountable to an intermediate lens, the intermediate lens including a first lens provided for achieving a specific optical function and a first drive controller operable to control drive of the first lens, the interchangeable lens comprising:
a second lens provided for achieving the same specific optical function as the first lens, wherein both the first and second lens are zoom lenses;
a second drive controller operable to control drive of the second lens;
an operation unit operable to receive an operation performed by a user; and
an interchangeable lens controller operable to send a signal for driving the first lens to the first drive controller and/or send a signal for driving the second lens to the second drive controller, according to the operation received by the operation unit for achieving the specific optical function.

8. The interchangeable lens according to claim 7, wherein the operation received by the operation unit for achieving the specific optical function is an instruction to drive the first lens and/or the second lens.

9. An intermediate lens mountable between an interchangeable lens and a camera body, the intermediate lens comprising:
a zoom lens;
a lens driver operable to drive the zoom lens;

a first receiving unit operable to receive a control signal for driving the zoom lens from the camera body;

a second receiving unit operable to receive a control signal for driving the zoom lens from the interchangeable lens; and a controller operable to control the lens driver based on the control signal received through the first or second receiving unit.

10. An intermediate lens mountable between an interchangeable lens and a camera body, the intermediate lens comprising:

a zoom lens;

a lens driver operable to drive the zoom lens;

a receiving and transmitting unit configured to receive and send control signals from and to the interchangeable lens and the camera body; and a controller coupled to the receiving and transmitting unit and the lens driver, the controller configured to:

control the lens driver based on the control signals received from the interchangeable lens or the camera body;

determine whether a control signal received from the camera body is intended for the interchangeable lens; and control the receiving and transmitting unit to forward the determined control signal to the interchangeable lens.

11. The intermediate lens of claim 10, wherein the controller is further configured to control the lens driver to drive the zoom lens after receiving a control signal indicating that a lens associated with one of the camera body or the interchangeable lens has reached maximum magnification.

* * * * *